United States Patent [19]

Tokutomi et al.

[11] 4,258,989

[45] Mar. 31, 1981

[54] FOCUS DETECTING DEVICE

[75] Inventors: Seijiro Tokutomi, Tokyo; Ryota Ogawa, Kawagoe; Michiro Ohishi; Kazuo Nakamura, both of Tokyo; Masao Jyojiki, Tsurugashima; Satoru Tachihara, Wako, all of Japan

[73] Assignee: Asahi Kogaku Kogyo Kabushiki Kaisha, Tokyo, Japan

[21] Appl. No.: 33,067

[22] Filed: Apr. 25, 1979

[30] Foreign Application Priority Data

May 2, 1978 [JP] Japan .................................. 53-52994

[51] Int. Cl.³ ...................... G03B 13/18; G03B 17/20
[52] U.S. Cl. ......................................... 354/25; 354/1; 354/198; 250/204
[58] Field of Search ................... 354/25, 195, 198, 31; 355/56; 250/204–395, 201; 350/27, 46, 47

[56] References Cited

U.S. PATENT DOCUMENTS

| | | | |
|---|---|---|---|
| 4,047,022 | 9/1977 | Holle | 354/25 |
| 4,132,838 | 1/1979 | Kondo | 250/204 |
| 4,180,309 | 12/1979 | Migata | 354/25 |

Primary Examiner—L. T. Hix
Assistant Examiner—S. D. Schreyer
Attorney, Agent, or Firm—Sughrue, Rothwell, Mion, Zinn and MacPeak

[57] ABSTRACT

A focus detecting device having a release lens for reforming the image of an object which is formed between a lens and the focal plane of the lens. A mirror is provided between the release lens and an image reforming plane for dividing the primary image into two secondary images. Two light receiving element arrays provided in the image forming planes of said secondary images provide outputs to a signal processing circuit for comparison to produce a signal indicating whether or not the lens is focussed on the object. The mirror for dividing the primary image into two secondary images, shifts the two secondary images in opposite directions on the light receiving element arrays at the time of defocussing so that the difference between the outputs of said two light receiving element arrays is not zero. At the time of focussing, the two secondary images are located at equivalent positions on the light receiving element arrays so that the difference between the outputs of said two light receiving element arrays is zero.

11 Claims, 12 Drawing Figures

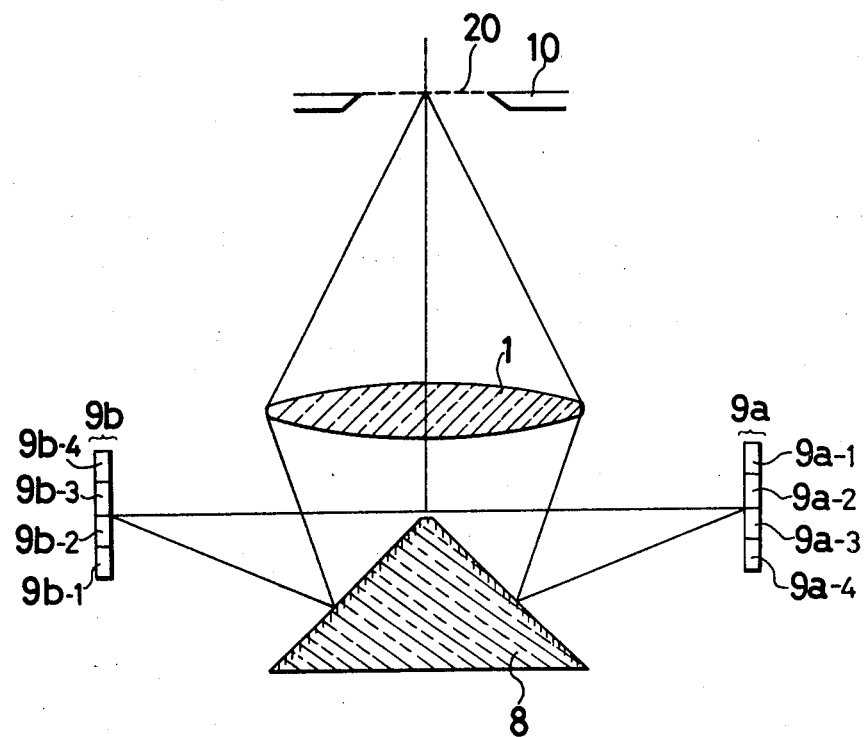
FIG. 5
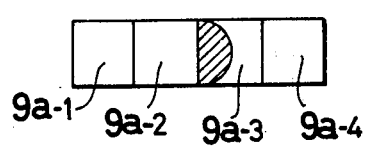
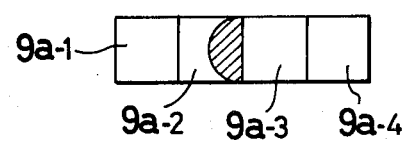
FIG. 6a    FIG. 6b
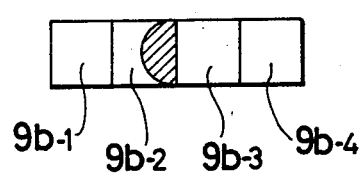
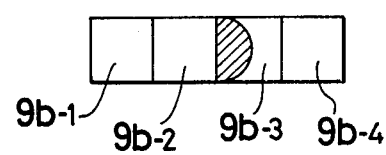

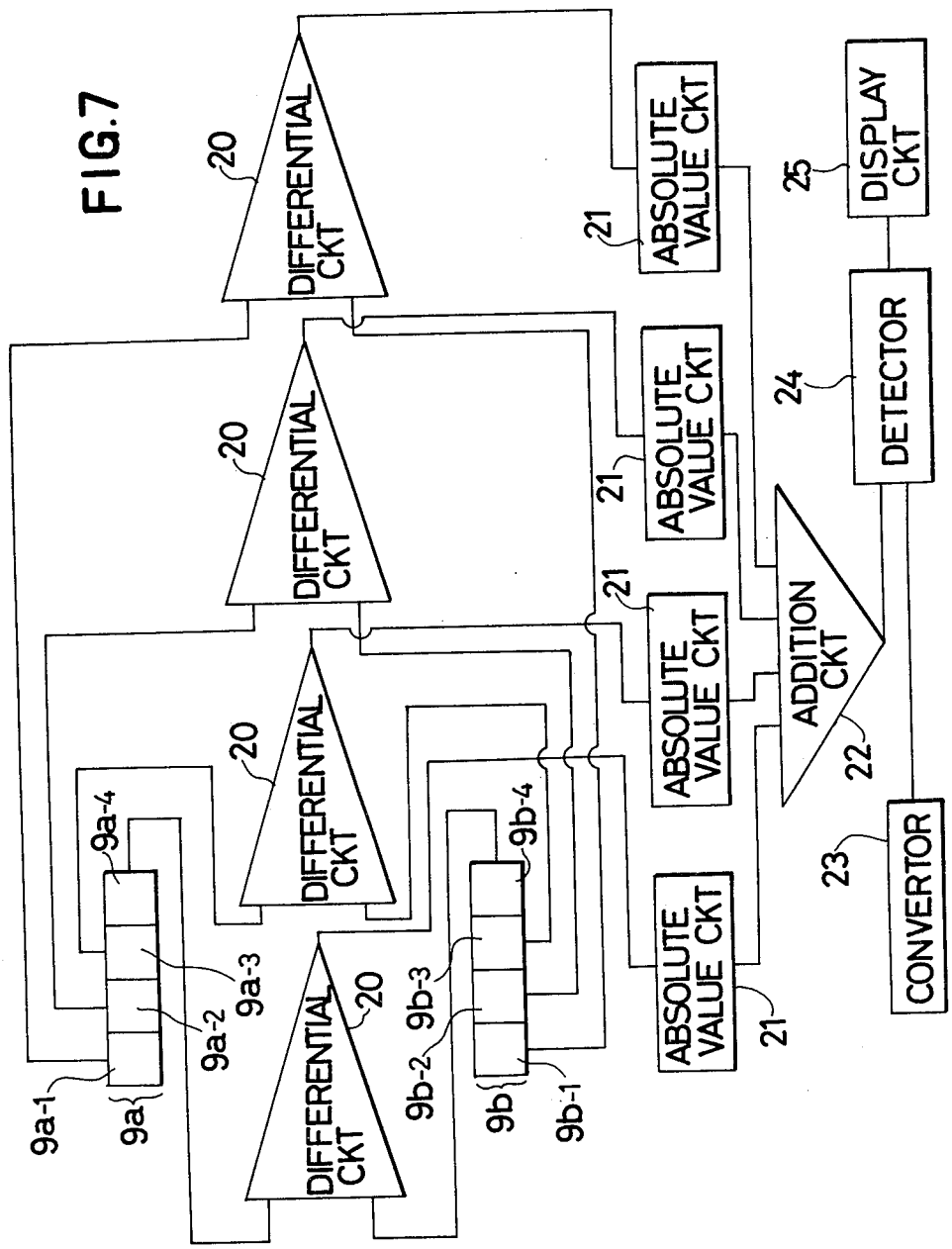

FIG. 8
FIG. 9
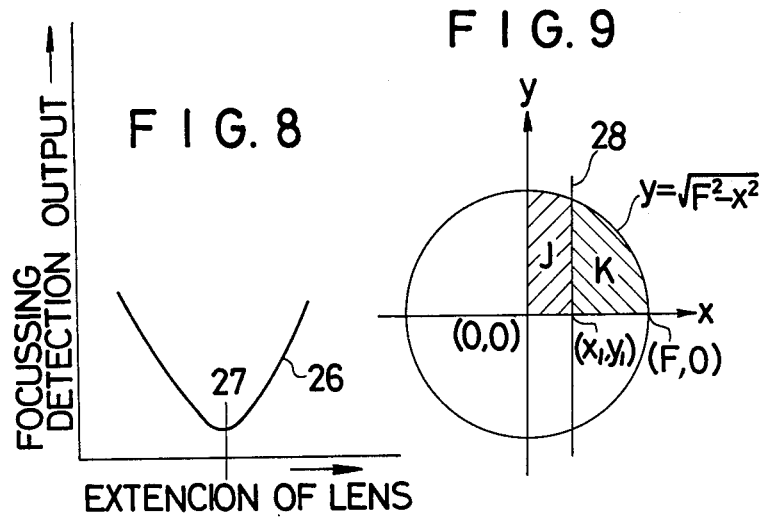
FIG. 10
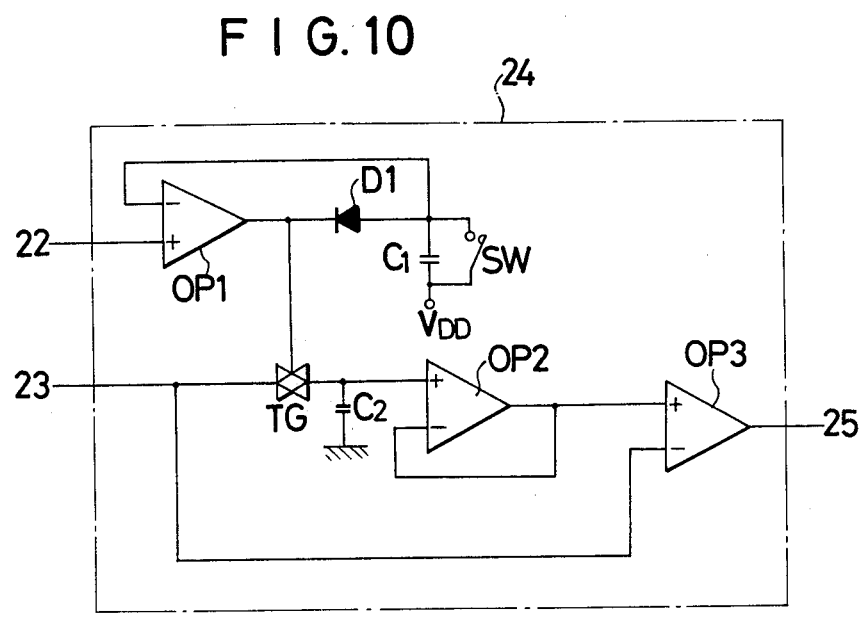

FOCUS DETECTING DEVICE

BACKGROUND OF THE INVENTION

This invention relates to focus detecting devices, and more particularly to a focus detecting device which is applicable to cameras.

Focus detecting methods have been proposed in the art, in which focussing is detected by utilizing the fact that the contrast, spatial frequency or light quantity of an object is changed according to the degree of focussing. In a first of the conventional methods, a photoelectric element such as a CdS cell having a particular contrast sensing characteristic is utilized. In a second method, a photoelectric output signal obtained by mechanically vibrating or rotating an optical member is utilized. In a third method, similar to the case of a range/view finder, two outputs of light detecting members disposed at different positions for detecting the focus condition.

However, the first method suffers from the disadvantage that it is difficult to detect correct focus with high accuracy. This is because it is difficult to manufacture photoelectric elements having the same light response characteristic. Also, the output variation rate of the photoelectric elements is low before and after focussing is obtained in detecting the focussing in situations of low intensity illumination. The second method is disadvantageous in that it is difficult to minaturize the camera because it has mechnaically movable components. Such a system also consumes relatively large quantities of electric power. The third method is also disadvantageous in that it is difficult to have interchangable lenses in range finder types of cameras.

SUMMARY OF THE INVENTION

Accordingly, an object of this invention is to provide an optical-focus detecting device capable of miniaturization of the optical system.

It is another object of this invention to provide a focussing system that maintains high accuracy, correct operation at low intensity of illumination, and operation with low electric power consumption.

A further object of this invention is to define an optical focus detection system that is useable in a camera having interchangeable lenses.

Yet, another object of this invention is to provide an optical focus detection system having wide utility in a variety of optical systems.

These and other objects of this invention are attained in a focus detecting device having a release lens for reforming the image of an object which is formed between a lens and the focal plane of a lens. A mirror is provided between the release lens and an image reforming plane for dividing the primary image into two secondary images.

Two light receiving element arrays provided in the image forming planes of said secondary images provide outputs to a signal processing circuit for comparison to produce a signal indicating whether or not the lens is focussed on the object. The mirror for dividing the primary image into two secondary images, shifts the two secondary images in opposite directions on the light receiving element arrays at the time of defocussing so that the difference between the outputs of said two light receiving element arrays is not zero. At the time of focussing, the two secondary images are located at equivalent positions on the light receiving element arrays so that the difference between the outputs of said two light receiving element arrays is zero.

One example of a focus detecting device according to this invention will be described with reference to the accompnaying drawings, in which like parts are designated by like numerals or characters.

BRIEF DESCRIPTION OF THE DRAWINGS

FIG. 5 is an enlarged view of a section of the FIG. 4;

FIG. 6 is a schematic diagram showing the light receiving element arrays, and the image of the object which is projected onto the light receiving element arrays when the lens is not focussed on the object;

FIG. 7 is a block diagram showing a processing circuit;

FIG. 8 is a graphical representation indicating electrical quantity (on horizontal axis) corresponding to an amount of extension of the lens with a focus detection output (on vertical axis);

FIG. 9 is a graph showing the division of a sector of a circle for an explanation of the centering coordinates; and FIG. 10 is one example of a circuit for detecting the minimum value of the focus detection output shown in FIG. 7.

DETAILED DESCRIPTION OF THE PREFERRED EMBODIMENTS

Figure 1:
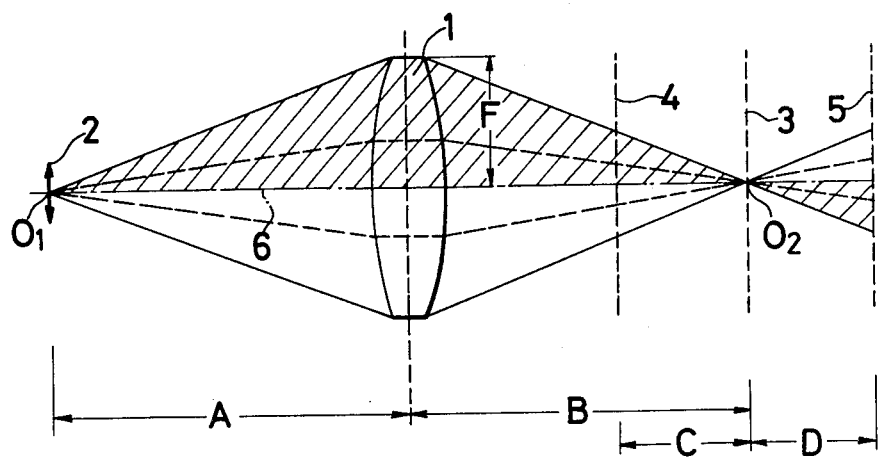
FIG. 1 is a schematic diagram of a description of the principle of the invention, showing the optical path of a bundle of rays from a portion of an object which is on the optical axis.

Referring now to FIG. 1, a diagram of a description of the focus detecting principle of the device according to the invention will be explained. A bundle of rays from an object 2 is applied to a lens 1 and the image of the object 2 is projected onto an image forming plane 3. It is assumed that the distance between the object 2 and the principal point of the lens is A, and the distance between the principal point of the lens and the image forming plane, B. Reference numeral 6 designates an optical axis. The optical rays from point $0_1$ of the object on the optical axis pass through the entire surface of the lens 1 and converge at the point $0_2$ on the optical axis. For simplification in description, it is assumed that the rays are applied equally to the entire surface of the lens; that is, the quantity of light is equal over rhe entire surface of the lens.

Consider now two planes 4 and 5 which are located at the distances C and D from the image forming plane 3 as shown respectively in FIG. 1. Plane 4 is on the left side of the image forming plane 3 and plane 5 being on the right side. As indicated by the shadowed portion, the bundle of rays passing through the upper half of the lens is above the optical axis 6 on the left side of the image forming plane 3 and is below the optical axis on the right side of the plane 3.

Figure 3A:
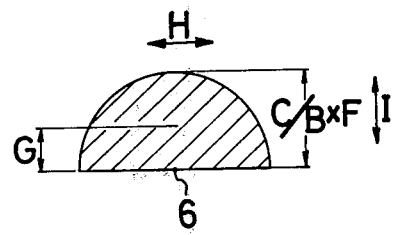
FIG. 3 is a sectional view of the bundle of rays with FIG. 3(a) a sectional view of the bundle of rays at a plane 4, FIG. 3(b) a sectional view of the bundle of rays at an image forming plane, and FIG. 3(c) a sectional view of the bundle of rays at a plane 5.
Figure 3B:
Figure 3C:
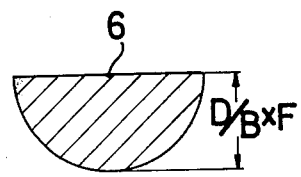

The sections of the bundle of rays at the planes 3, 4 and 5 are as follows: The section of the bundle of rays at the plane 4 is a half circle whose radius is C/B×F as shown in FIG. 3(a). The section of the bundle of rays at the plane 5 is a half circle whose radius is D/B×F as shown in FIG. 3(c), the half circle being below the optical axis 6. It is obvious that the bundle of rays forms a point at the plane 3 as shown in FIG. 3(b). The focus detecting principle of this invention can be explained from the movement of the bundle of rays under the unfocussed condition. The amount of movement of the center of the section of the bundle of rays is considered equivalent to the amount of movement of the unfocussed image. For instance, if the bundle of rays is uniform, then the center of the half circle in FIG. 3(a), when the quantity of light thereof is taken into account, is equal to the center of the area. Therefore the center of the area of the half circle is approximately 0.4F·C/B above the optical axis.

Consider now a half circle drawn on a plane with the coordinate axes as shown in FIG. 9 in order to obtain the center of the area of the half circle. Let the coordinates of the center of the area be $(x_1, y_1)$, then , $y_1=0$ because the x coordinate axis is the symmetrical axis. For the same reason, the $x_1$ coordinate can be obtained from a perpendicular line 28, $x=x_1$, which divides the quarter circle in the first quadrant of the x-y coordinate system into two regions J and K equal in area. It is apparent that the area of each of the regions is ¼ of the area of the half circle. This can be expressed by the following equation:

$$\int_0^{x_1} \sqrt{F^2 - x^2}\, dx = \int_{x_1}^{F} \sqrt{F^2 - x^2}\, dx = \pi F^2/8$$

Then, $x_1 = 0.40397... \times F$.

Therefore, the center of the area of the bundle of rays is remote by about 0.4F·C/B from the optical axis 6. The image is moved vertically as viewed in the figure. This amount of movement is represented by the distance G in FIG. 3(a). Therefore, G=0.4F·C/B.

Consider the case where the optical system in FIG. 1 is applied to a camera. In such a mode of utilization it is assumed that the plane 3 is the film surface when the lens is focussed ont the object, the plane 4 is the film surface when the lens is focussed on a point in rear of the object (hereinafter referred to as "rear defocussing" when applicable), and the plane 5 is the film surface when the lens is focussed on a point in front of the object (hereinafter referred to as "front defocussing" when applicable). The image of the object on the optical axis is shifted G=0.4F·C/B above the optical axis in the case of the rear defocussing, and it is shifted 0.4F·D/B below the optical axis in the case of the front defocussing. In this connection, the distance C is the amount of rear defocussing, and the distance D is the amount of front defocussing.

The case where the upper half of the photographing lens is covered to allow a bundle of rays passing through the lower half of the lens to form an image will now be discussed. The image formed by the bundle of rays passing through the lower half of the lens from the object below the optical axis at the plane 4. The amount of movement therof is −G= −0.4F·C/B. With respect to the image above the optical axis at the plane 5, the amount of movement thereof is 0.4F·D/B. The direction of movement of the image is opposite to that of the image which is formed by the bundle of rays passing through the upper half of the lens. The centers of the images which are formed by the two bundles of rays passing respectively through the upper and lower halves of the lens are spaced from each other 0.8F·D/B in the case of front defocussing and 0.8F·C/B in the case of rear defocussing.

Figure 2:
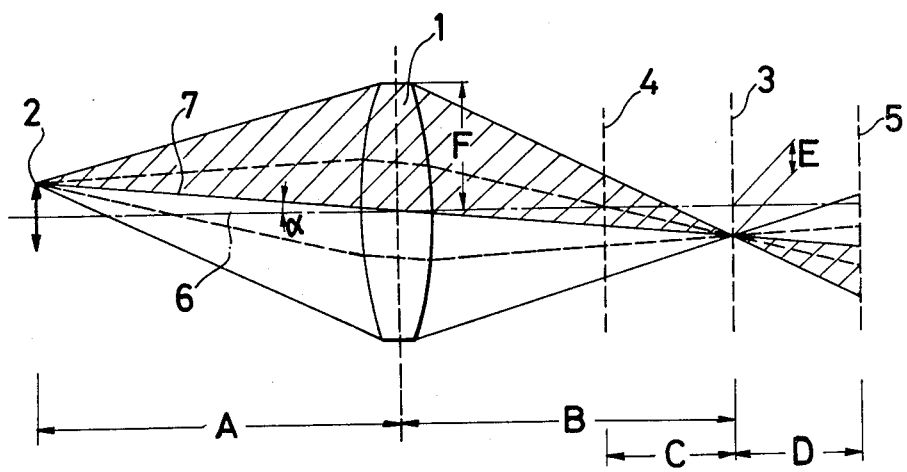
FIG. 2 is a schematic diagram of a description of the principle of the invention, showing the optical path of a bundle of rays from a portion of the object, which is remote from the optical axis.

As shown in FIG. 2, a bundle of rays form a point on an object off the optical axis, forms an image at a distance E below the optical axis and on an image plane 3. If the distance E is changed, all of the bundles of rays from all the points on the object can be investigated; however, the optical components perpendicular as viewed in FIG. 2 (or in the direction of the arrow H in FIG. 3) will be disregarded in the description of the movement because the movement of the image is vertical (or in the direction of the arrow I in FIG. 3).

A second case exists similar to the above-described case, where the upper half of the lens is covered to permit the bundle of rays (shadowed in FIG. 2) to pass through the lower half of the lens to form an image. In this case, the center of the quantity of light thereof is displaced $0.4 \times F \times C/B - \tan\alpha\,(B-C)$ from the optical axis 6 at plane 4, and $0.4 \times F \times D/B + \tan\alpha\,(B+D)$ from the optical axis 6 at plane 5. $\alpha$ is the angle formed by the main optical axis 7 and the optical axis 6. Furthermore, in the case of the image formed by the bundle of rays passing through the lower half of the lens, the center of the quantity of light thereof is remote $0.4 \times F \times C/B + \tan\alpha\,(B-C)$ from the optical axis at the plane 4, and $0.4 \times F \times D/B - \tan\alpha\,(B+D)$ from the optical axis at the plane 5. In the latter case, the direction of movement of the image is opposite to that of the image formed by the bundle of rays passing through the upper half of the lens. The distance between the images formed by the bundles of rays passing through the upper and lower halves of the lens is 0.8·C/B on plane 4, and 0.8F·D/B on plane 5.

The image movement in the focus detecting principle of the invention is as described above. In FIGS. 1 and 2, the dotted lines indicate the light quantity centers of the upper and lower bundles of rays. Two bundles of rays passing through the upper half and the lower half of the lens converge at one point on the focussing plane only. They are not at the same position in the case of defocussing; that is the sections of the bundles of rays at a plane are located at different positions. This is an essential principle of the invention. In the device according to the invention, the two bundles of rays are received by light receiving elements, so that the focussing is detected by determining whether or not the outputs of the light receiving elements are equal.

Figure 4:
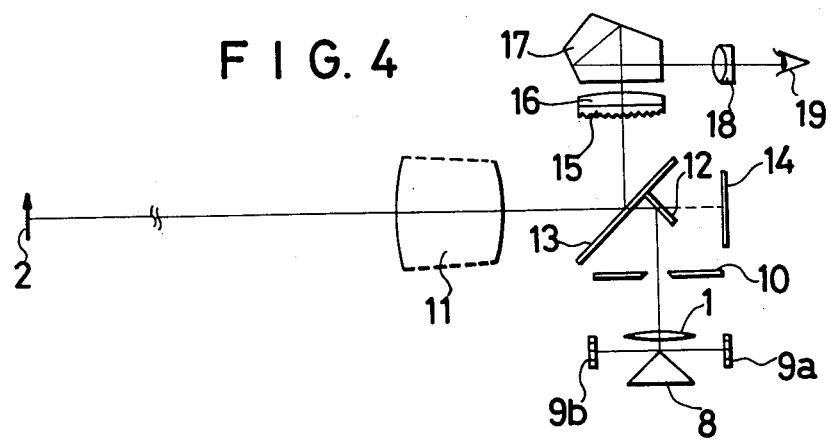
FIG. 4 is a schematic diagram showing one example of a single-lens reflex camera to which a focus detecting device according to the invention is applied.

FIG. 4 is a schematic diagram showing a single lens reflex camera to which the technical concept of the invention is applied. The device according to the principle of image movement described above comprises a release lens 1, a roofshaped mirror 8, light receiving element arrays 9a and 9b, and an aperture 10. Light from an object 2 passes through a photographing lens 11. A part of the light is reflected upwardly by a mirror 13 having a half mirror at the central portion thereof. This light passes through a focussing screen 15, a condenser lens 16, a penta-prism 17 and a magnifier 18, and is then observed by the eye 19. The other portion of the light passes through the half-mirror section of the mirror 13, and is introduced by a total reflection mirror 12 downwardly to the device according to the invention. The aperture 10 serves as a limit board adapted to determine the field of vision of the device.

FIG. 5 is an enlarged view of the assembly of the aperture 10, the lens 1, the mirror 8 and the light receiving element arrays shown in FIG. 4. Each of the light receiving element arrays 9a and 9b is made up of four light receiving elements. More specifically, the light receiving element array 9a is made up of four light receiving elements $9_{a-1}$, $9_{a-2}$, $9_{a-3}$ and $9_{a-4}$, and the light receiving element array 9b is made up of four corresponding light receiving elements $9_{b-1}$ through $9_{b-4}$. The arrangement of the light receiving elements in the light receiving element array 9a is opposite to that of the light receiving elements in the light receiving element array 9b. This is because, in the case where the light receiving element arrays 9a and 9b are in the secondary image planes, the direction of the image formed on the array 9a is opposite to that of the image formed on the array 9b. The elements $9_{a-1}$ and $9_{b-1}$, $9_{a-2}$ and $9_{b-2}$, $9_{a-3}$ and $9_{b-3}$, and $9_{a-4}$ and $9_{b-4}$ observe the same images when the light receiving element arrays are in planes which are equivalent to the image forming plane, i.e., the film surface when proper focus is obtained. Hereinafter, the elements $9_{a-1}$ and $9_{b-1}$, $9_{a-2}$ and $9_{b-2}$, $9_{a-3}$ and $9_{b-3}$, and $9_{a-4}$ and $9_{b-4}$ will be referred to as "pairs of light receiving elements".

The movement of the images on the light receiving elements is indicated in FIG. 6. A point image on the optical axis is projected in such a manner that, as indicated by the shadowed portions in FIG. 6(a), the halves of the image are spread in the opposite directions in the case of rear focussing and the distance between the centers of the bundles of rays thereof in the direction of arrangement of the light receiving elements is 0.8F·C/B. In the case of front focussing, the point image is projected in such a manner that, as indicated by the shadowed portions in FIG. 6(b), the halves of the image are spread in the opposite directions, and the distance between the bundles of rays thereof in the direction of arrangement of the light receiving element is 0.8F·D/B. This movement of the image occurs for all of the bundles of rays applied to the light receiving elements. The bundle of rays applied to the light receiving element array 9a is equal to the bundle of rays applied to the light receiving element array 9b only when the focussing is obtained. That is, the optical outputs of the pair of light receiving elements $9_{a-1}$ and $9_{b-1}$ are equal to each other. In addition, the optical outputs of the pairs of light receiving elements $9_{a-2}$ and $9_{b-2}$, $9_{a-3}$ and $9_{b-3}$, and $9_{a-4}$ and $9_{b-4}$ are equal, respectively. Accordingly, the sum of the absolute values of the differences between the outputs of the pairs of light receiving elements, $$\sum_{i=1}^{4} |9_{a-i} - 9_{b-i}|$$

is zero, where the outputs of the photo-electric outputs of the light receiving elements in the light receiving element arrays 9a and 9b are represented by $9_{a-1}$, $9_{a-2}$, $9_{a-3}$, $9_{a-4}$, $9_{b-1}$, $9_{b-2}$, $9_{b-3}$ and $9_{b-4}$, respectively.

FIG. 7 shows one example of a processing circuit which is provided according to this invention. The differences between the outputs of the pairs of light receiving elements $9_{a-1}$ and $9_{b-1}$, $9_{a-2}$ and $9_{b-2}$, $9_{a-3}$ and $9_{b-3}$, $9_{a-4}$ and $9_{b-4}$ are obtained in four differential circuits 20, respectively. The absolute values of the outputs of the differential circuits 20 are obtained in absolute value circuits 21, respectively. The outputs of the absolute value circuits 21 are applied to an addition circuit 22 adapted to subject the outputs of the absolute value circuits to addition, whereby the outputs $$\sum_{i=1}^{4} |9_{a-i} - 9_{b-i}|$$

are provided which is employed as the focus detection output. A circuit 23 operates to convert an amount of extension of the lens into an electrical value. This output, or the electrical value, will be considered in association with the aforementioned focus detection output.

FIG. 8 is a graphical representation with the outputs corresponding to the amounts of extension of the lens as the horizontal axis and with the focus detection outputs of the addition circuit 22 plotted on the vertical axis. The focus detection outputs of the device according to the above-described focus detection principle should be zero at the time of focussing. However, in practice, it takes the minimum value as shown in FIG. 8 because of noise in the circuit. In FIG. 8, reference numeral 26 designates the focus detection output curve and reference numeral 27 designates a point at which correct focus is obtained.

Referring back to FIG. 7, reference numeral 24 designates a circuit for detecting the minimum value of the focus detection output. The circuit 24 is designed so that when the focus detection output has the minimum value, the amount of extension of the lens can be detected and then the position of focussing can be detected by scanning the lens only once. Reference numeral 25 designates a display circuit. Shown in FIG. 10 is one example of the minimum value detection circuit 24, where the output of the addition circuit 22 is applied to the non-inverted terminal (+) of an operational amplifier $OP_1$. When the output of the addition circuit 22 has the minimum value, the output of the OP amplifier $OP_1$ is inverted from negative level to positive level due to the operations of a capacitor $C_1$, a diode $D_1$ and the OP amplifier $OP_1$. A switch SW is designed to open in response to the start of focus detection operation. Reference character TG designates a semi-conductor switch which operates to be in conductive state when the output of the OP amplifier $OP_1$ is of negative level, and to be in non-conductive state when it is of positive level. A capacitor $C_2$ operates to store the output of the circuit 23 when the semi-conductor switch TG is in the non-conductive state. An operational amplifier $OP_2$ is a buffer amplifier to the stored output of the circuit 23. An operational amplifier $OP_3$ is a well known coincidence circuit where the output of the circuit 23 is compared with the stored content of the capacitor 2, and a signal representative of the fact whether the both signals are conincident each other or not is outputted to the display circuit 25. The display circuit 25 is designed so that, when the focussing is obtained, it is indicated by a light emission diode or a lamp which is provided to permit the user to readily see it in the viewer. Such displays for aperture or shutter speed are well known. If the output signal of the display circuit is employed to drive a servo mechanism thereby to control the amount of extension of the lens, then the camera may be converted into an automatic focussing type camera.

The arrangement and function of this invention offer the following merits: Since the components of the device according to the invention are only the lens, the mirror, the light receiving elements, and a simple electronic circuit, the device can be manufactured small in size and light in weight. In addition, since the power consuming sections are small, the device can be operated with a small power consumption. The focus detecting operation is high, and the detection sensitivity is also high. This is achieved since the movement of image is utilized for detecting the focussing. However, another reason is that silicon photo-diodes, chemical semiconductors, CCD's or self-scanning type image sensors can be used as the light receiving elements. Furthermore, the optical path is divided by the mirror, and therefore the construction is simple, and the loss in light quantity is low leading to high detection sensitivity.

The device according to the invention can be applied to optical equipment such as enlargers, slide projectors and movie projectors as well as cameras.

It is apparent that modifications are possible without departing from the essential scope of this invention.

What is claimed is:

1. A focus detecting device comprising; a release lens for reforming a primary image of an object which is formed relative to a photographing lens and the focal plane of said photographing lens to produce an image reforming plane; a mirror provided optically between said release lens and said image reforming plane for dividing the primary image into two secondary images; a pair of light receiving element arrays provided in the image forming planes of said secondary images; and signal processing circuit means for subjecting the outputs of said light receiving element arrays to comparison and producing an output signal indicating whether or not said lens is focussed on said object, wherein said two secondary images are shifted in the opposite direction on said light receiving element arrays if the image is defocussed so that the difference between the outputs of said two light receiving element arrays is not zero, and when the image is focussed said two secondary images are located at equivalent position on said light receiving element arrays so that the difference between the outputs of said two light receiving element arrays is substantially zero.

2. The device of claim 1 further comprising display means receiving the output signal from said signal process circuit for indicating the state of focus.

3. The device of claims 1 or 2 wherein said signal processing circuit means comprises differential circuit means responsive to the outputs of a corresponding pair of elements in said pair of light receiving element arrays, absolute value circuit means for converting the output of said differential circuit means into an absolute value signal, transducer means to convert the extension of said lens into an electrical signal and detector means receiving said electrical signal and said absolute value signal and producing said output signal.

4. The device of claim 3 wherein said detector means produces said output signal as a function of minimum absolute value with respect to lens extension.

5. The device of claim 3 wherein said light receiving arrays respectively comprise a series of N light sensitive elements.

6. The device of claim 5 wherein said differential circuit means comprises a series of N differential circuits, said absolute value circuit means comprises N absolute value detectors coupled respectively to said differential circuits and further comprising an addition circuit for adding the outputs of said absolute value detectors and supplying said absolute value signal to said detector means.

7. The device of claim 5 wherein said light sensitive elements are selected from the group consisting of silicon photo-diodes, chemical semiconductors, charge coupled devices and self scanning type image sensors.

8. The device of claims 1 or 2 wherein said lens comprises of photography lens on a camera.

9. The device of claim 8 further comprising a mirror receiving the primary image and deflecting said image to said release lens thereby allowing viewing of said image in a view finder of said camera.

10. The device of claim 9 further comprising an aperture positioned between said mirror means and said release lens.

11. The device of claim 1, wherein said mirror is roof-shaped having two surfaces, disposed relative to the optical axis of said release lens so as to reflect the light passing through said release lens to provide said two secondary images.

* * * * *